Patented Mar. 18, 1947

2,417,713

UNITED STATES PATENT OFFICE 2,417,713

PRODUCTION OF GELATIN LAYERS

Oswald Stein, Watford, England, assignor to Ilford Limited, Ilford, England, a British company No Drawing. Application February 17, 1941, Serial No. 379,357. In Great Britain March 19, 1940

10 Claims. (Cl. 95—5.6)

This invention relates to the production of gelatin layers and to the production of gelatin photographic images therefrom.

In forming layers from gelatin, it is usual to warm the gelatin with water until a liquid solution is obtained, to form a layer by coating the solution thus produced on a suitable support and then to allow the solution to cool and thus set in gel form. The use of heated materials is not always convenient and may involve special design of the coating apparatus with appropriate temperature controls.

It is an object of this invention to produce gelatin layers in gel form without any such heating operation. It is a further object of the invention to produce gelatin photographic images with the aid of gelatin layers so produced and a still further object is to produce pigmented or unpigmented gelatin relief photographic images with the aid of gelatin layers so produced. Other objects of the invention will appear hereinafter.

Aqueous solutions of gelatin which would normally form gels at ordinary room temperatures, e. g., 10–20° C. may be caused to remain in sol form at such temperatures by the addition of certain organic and inorganic substances (hereinafter referred to as "liquefying substances"), and it has now been discovered that by removing such added liquefying substances or converting them to an inactive form, the gelatin may be caused to regain substantially its original properties and thus set to gel form at ordinary room temperatures.

According to the present invention, therefore, gelatin layers, in gel form, are formed by coating a supporting surface at room temperature with an aqueous solution of gelatin containing a substance which reduces the setting point of the solution in such amount that the solution remains liquid at room temperature, and thereafter treating the liquid layer to stop the effect of such substance whereby the gelatin is caused to set in gel form.

A wide variety of liquefying substances may be employed as agents for reducing the setting point of the gelatin. As examples of suitable substances there may be mentioned urea, potassium nitrate, sodium nitrate, calcium chloride, magnesium chloride, potassium iodide, barium chloride, potassium thiocyanate, sodium salicylate, the sodium salt of α-naphthalene sulphonic acid and chloral hydrate. This list is by no means exhaustive and it will be obvious that other liquefying substances suitable for the process may readily be ascertained by a simple laboratory test.

The coating liquid may conveniently be prepared by warming the gelatin with water until it becomes dissolved, mixing in the liquefying substance and allowing the mixture to cool; if sufficient of a suitable liquefying substance has been added, the gelatin solution remains liquid even at room temperature. Alternatively, the liquefying substance may be mixed with the gelatin before dissolving the latter.

The method of stopping the effect of the liquefying substance when it is desired to cause the liquid gelatin layer to set in gel form may vary with the nature of the particular liquefying substance employed. Thus, its effect may be stopped by immersing the liquid gelatin layer in cold water and thus dissolving out the substance. Alternatively, the liquid gelatin layer may be treated in a cold chemical bath which converts the liquefying substance chemically into another substance which does not possess the property of reducing the setting point of the gelatin solution; for example, a layer containing barium chloride as the liquefying substance may be immersed in a solution of sodium sulphate so that inert barium sulphate is formed in the layer.

The process may be employed in the formation of plain gelatin layers, or of gelatin layers containing suspended or dissolved matter.

According to a further feature of this invention gelatin photographic images are produced by forming a set gelatin layer in the manner described above on the surface of a photographic silver image, and subjecting the product to treatment with a bath which has the property of bleaching the silver image and of simultaneously hardening the gelatin over the area of the silver image in proportion to the silver present. Suitable bleaching and hardening baths are the dichromate bleaching baths well known in the art. Such images may be differentially dyed or converted to relief images or otherwise treated as known in the art. The underlying silver salt image may be removed by treatment with any of the usual photographic fixing baths.

According to a further and particularly important feature of the invention pigmented gelatin photographic relief images are produced by forming a set gelatin layer in the manner described above, using a gelatin solution containing a finely divided pigment in suspension, subjecting the product to treatment with a bath which has the property of bleaching the silver image and of simultaneously hardening the gelatin over the area of the silver image in proportion to the silver present, and thereafter removing the unhardened gelatin. The underlying silver salt image may be removed by treatment with any of the usual photographic fixing baths.

In this way a photographic relief image is formed in pigmented gelatin upon the original silver image support.

Methods for the production of pigmented gelatin relief photographic images are already known, notably in the Carbro printing process. This process relies on a chemical treatment of a separately prepared gelatin layer which treatment hardens the gelatin over the area of the silver image in proportion to the silver present. Attempts to produce pigment prints by applying to the surface of a print carrying a silver image a solution of a liquid colloid carrying a pigment in suspension and thereafter treating the print so as to harden the colloid over the area of the silver image in proportion to the silver present have hitherto met with little success. Thus, if a water-soluble colloid is used which is liquid at ordinary temperatures, and so can be readily brushed, poured or otherwise applied as a coating over the silver image, then treatment of the product in an aqueous bath (for example, cold water or the bath used for hardening the colloid) becomes impossible for the reason that the colloid floats off the silver image or goes into solution. If, on the other hand, a colloid such as glue or gelatin is used which exists in gel form at ordinary temperatures, it is necessary to apply it to the silver image in the heated condition and for satisfactory results it may even be necessary also to warm the print carrying the silver image so that an even coating may be obtained. Moreover, this process, and the products obtained by its use, present no advantage over the Carbro process and products.

By the process of the present invention these difficulties are overcome and very satisfactory pigment prints are obtained.

Various pigments may be employed, but water-insoluble mineral or vegetable pigments are preferred. Examples are sienna earth, ochre, Vandyke brown, bone black, lamp black, Prussian blue, chrome green and ultramarine.

In preparing pigmented gelatin photographic relief images according to this invention, a gelatin medium is first prepared by adding to a gelatin solution, sufficient of a suitable liquefying substance. The pigment is then worked into this medium, preferably to form a thickly liquid mass. The mass may then be diluted with water, and further gelatin added if desired, to form a uniform liquid suspension of the pigment which is capable of being applied to a surface by brushing or pouring at room temperature. A photographic element carrying a silver image is then coated with this liquid by brushing, pouring or spraying at room temperature, care being taken to obtain a coating of adequate thickness, which however need not be very uniform in thickness for the subsequent treatments. The coated photographic element is then immersed in an aqueous bath capable of stopping the effect of the liquefying substance. In most cases it is sufficient to immerse the element in cold water. It is preferable, though not essential, to use water at a temperature slightly below room temperature. Since the gelatin layer is still liquid before the treatment of the element with water, the introduction of the element into water must be effected with reasonable care, but a few seconds in the water bath are usually sufficient to set the surface of the gelatin layer to an extent which makes further precaution unnecessary.

After a few minutes the liquefying substance is substantially removed and the gelatin layer is sufficiently rigid to permit of further processing of the photographic element at temperatures lower than the normal melting point of the gel.

If the liquefying substance employed is one which is readily capable of conversion to a substance which does not possess the liquefying property, the effect of the liquefying substance can readily be stopped by treatment of the photographic element in a cold liquid which effects such conversion. For example, if barium chloride is used as the liquefying substance, its effect may be stopped by immersing the photographic element in a cold aqueous 3–5% solution of sulphuric acid, whereby the barium chloride is converted to insoluble barium sulphate.

The photographic element carrying the pigmented gelatin layer in gel form is then treated with a bath which has the property of bleaching the silver image whilst simultaneously hardening the gelatin over the area of the silver image in proportion to the silver present. Suitable baths are those having a basis of potassium dichromate, e. g., a bath containing potassium dichromate, sodium chloride and cupric chloride. After this treatment the photographic element is "developed" in luke warm water which dissolves away the unhardened gelatin leaving a relief image in pigmented gelatin corresponding to the original silver image.

As a modification of this process the step of stopping the effect of the liquefying substance may be carried out simultaneously with the bleaching operation. Thus the aqueous bleaching bath will dissolve out a water-soluble liquefying substance. Another method is to include in the bleaching bath a substance which will react with the liquefying substance, e. g., a sulphate. Thus for use with a gelatin layer containing barium chloride, there may be employed a bleaching bath containing potassium dichromate, sodium chloride and cupric sulphate; this last compound will react with the barium chloride to form barium sulphate, itself being converted to cupric chloride. However, in such cases it is important that the bleaching bath be maintained at a temperature well below the setting point of the liquefied gelatin.

The process of producing pigmented images according to this invention is susceptible of ready control. For example, the temperature of the water used for washing off the unhardened gelatin may be locally varied as desired. By varying the proportion of pigment to gelatin the contrast of the final image may be varied; higher ratios give images of harder contrast while lower ratios give images of softer contrast. Similarly, by varying the composition of the bleaching bath, variations in contrast may be obtained; higher concentrations of dichromate yield images of softer contrast and lower concentrations of dichromate yield images of harder contrast. Finally, the image may be re-touched as desired by the use of a soft brush or a water-spray.

By using a pigment of suitable particle size in high proportion relative to the gelatin, pigment relief images may be obtained which dry out dead matt and have a gravure-like appearance.

The following examples illustrate the invention but are not to be regarded as limiting it in any way:

EXAMPLE 1

*The production of a gelatin layer*

112 parts by weight of gelatin and 150 parts by weight of urea were added to 550 parts by weight of water and allowed to stand for one hour at room temperature. Gentle heat was then applied until the urea and gelatin both dissolved. The solution was then cooled to room temperature, and still remained liquid. The solution was then coated on a suitable support, e. g., glass, paper or film, at room temperature, and the coated support was then immersed in water at room temperature. The outer layer of the coating immediately set to a gel. The immersion was maintained for about five minutes and at the end of this time the whole coating was in gel form.

EXAMPLE 2

*The production of a gelatin photographic relief image*

A gelatin-urea solution was prepared as in Example 1 and was coated at room temperature on the emulsion surface of a paper print bearing a photographic image in metallic silver. The coated print was immersed for five minutes in water at room temperature and was then transferred to a bleaching solution comprising 50 gms. of cupric chloride, 24 gms. of sodium chloride and 5 gms. of potassium dichromate per litre of solution. The coated print was allowed to remain in this solution until the silver image was entirely bleached. It was then transferred to a bath of warm water maintained at 35° C. This water-bath dissolved away the unhardened gelatin leaving a gelatin relief image corresponding in depth with the silver image present in the original print. The print with its adherent relief image was then placed in a photographic fixing bath to remove silver chloride formed during the bleaching operation and was finally washed and dried.

EXAMPLE 3

*The production of a pigmented gelatin photographic relief image*

100 gms. of gelatin was soaked in 500 ccs. of cold water. After half an hour the gelatin was melted in a water bath. 100 to 150 gms. of urea were introduced into the still warm gelatin solution and dissolved with stirring. In this way a liquid solution was obtained which no longer set at temperatures above 15° C. This liquid solution was kept in storage bottles. 3 gms. of powdered burnt sienna were mixed with 10 ccs. of this solution and rubbed up in a mortar to a homogeneous liquid. This liquid pigment-gelatin mixture was applied to the emulsion surface of a paper print carrying a photographic silver image by means of a brush or in some other way in such a manner that the emulsion surface was coated with a layer of the mixture substantially uniform in thickness.

The paper print with the adhering liquid layer was then carefully immersed in cold water, in which the urea was dissolved out. The print remained in this bath for some minutes. When removed from the water it was introduced into a bath consisting of 1 part by weight of cupric chloride, 1 part by weight of sodium chloride and 0.05 part by weight of potassium dichromate all dissolved in 20 parts by weight of water. The print remained in this bath for about five minutes. It was then introduced into water at 25° C. (The temperature of the water may be varied up to about 40° C. as required according to the effect which is desired.) The development of the final pigment print took place automatically in this water in the course of a few minutes. The invisible silver salt image under the pigment image was then removed in the usual "hypo" fixing bath. After washing in cold water the finished print was dried.

EXAMPLE 4

The process of Example 3 was employed using calcium chloride instead of urea, and using 1 gm. of ultramarine mixed with 1 gm. of ivory black in place of the sienna as pigment. The working operations were carried out as before and yielded a blue-black image.

EXAMPLE 5

50 gms. of bone glue were dissolved in 50 ccs. of water and 15 gms. of barium chloride were added. 0.5 gm. of lamp black and 1.5 gms. of umber were worked into 10 ccs. of this mixture as in Example 3. After the brushing operation the print, instead of being immersed in water, was immersed in a cold 10% solution of sodium sulphate, in which the setting of the gelatin took place in consequence of the conversion of the barium chloride into barium sulphate. After an intermediate treatment with water the further treatment was carried out as described in Example 3.

Whilst in the foregoing Examples 3, 4 and 5 the ratio of pigment to colloid is high, it will be understood that considerably lower ratios may be employed, e. g., as low as 1:10 or even 1:100.

Where in the foregoing description and in the following claims reference is made to gelatin it is to be understood that glues, which are low grade gelatins and which set to gel form at ordinary temperatures, are included. Moreover, where in the foregoing description and in the following claims reference is made to a gelatin "solution" it is to be understood that this may be a dispersion and not a true solution.

What I claim is:

1. Process for the preparation of gelatin layers in gel form which comprises coating the emulsion surface of a photographic element carrying a silver image, at room temperature, with an aqueous solution of gelatin containing a water-soluble gelatin liquefying substance in such amount that the solution is in liquid form at room temperature, thereafter treating the liquid layer to stop the effect of such substance.

2. Process for the production of gelatin photographic images which comprises coating the emulsion surface of a photographic element carrying a silver image, at room temperature, with an aqueous solution of gelatin containing a water-soluble gelatin liquefying substance in such amount that the solution is in liquid form at room temperature, thereafter treating the liquid layer to stop the effect of such substance, whereby the gelatin solution is caused to set in gel form, and treating the photographic element carrying such gelatin layer with a bath which has the property of bleaching the silver image and of simultaneously hardening the gelatin over the area of the silver image in proportion to the silver present.

3. Process for the production of gelatin relief photographic images which comprises coating the emulsion surface of a photographic element carrying a silver image, at room temperature with an aqueous solution of gelatin containing a water-soluble gelatin liquefying substance in such amount that the solution is in liquid form at room temperature, thereafter treating the liquid layer to stop the effect of such substance, whereby the gelatin solution is caused to set in gel form, treating the photographic element carrying such gelatin layer with a bath which has the property of bleaching the silver image and of simultaneously hardening the gelatin over the area of the silver image in proportion to the silver present and thereafter removing the unhardened gelatin by treatment with warm water.

4. Process for the production of gelatin relief photographic images which comprises coating the emulsion surface of a photographic element carrying a silver image, at room temperature, with an aqueous solution of gelatin containing a water-soluble gelatin liquefying substance in such amount that the gelatin solution is in liquid form at room temperature, thereafter treating the liquid layer with an aqueous bath to dissolve out such water-soluble substance whereby the gelatin solution is caused to set in gel form, treating the photographic element carrying such gelatin layer with a bath which has the property of bleaching the silver image and of simultaneously hardening the gelatin over the area of the silver image in proportion to the silver present, and thereafter removing the unhardened gelatin by treatment with warm water.

5. Process for the production of gelatin relief photographic images which comprises coating the emulsion surface of a photographic element carrying a silver image, at room temperature, with an aqueous solution of gelatin containing a water-soluble gelatin liquefying substance in such amount that the gelatin solution is in liquid form at room temperature, thereafter treating the liquid layer with a solution of an agent capable of reacting with the said substance and thereby stop its effect on the melting point of the gelatin solution, whereby the gelatin solution is caused to set in gel form, treating the photographic element carrying such gelatin layer with a bath which has the property of bleaching the silver image and of simultaneously hardening the gelatin over the area of the silver image in proportion to the silver present, and thereafter removing the unhardened gelatin.

6. Process for the production of gelatin relief photographic images which comprises coating the emulsion surface of a photographic element carrying a silver image, at room temperature, with a solution of gelatin containing urea in such amount that the gelatin solution is in liquid form at room temperature, thereafter treating the liquid layer with an aqueous bath to dissolve out the urea, whereby the gelatin solution is caused to set in gel form, treating the photographic element carrying such gelatin layer with a bath which has the property of bleaching the silver image and of simultaneously hardening the gelatin over the area of the silver image in proportion to the silver present, and thereafter removing the unhardened gelatin.

7. Process for the production of pigmented gelatin relief images which comprises coating the emulsion surface of a photographic element carrying a silver image, at room temperature, with an aqueous solution of gelatin containing a finely divided pigment in suspension and containing a water-soluble gelatin liquefying substance in such amount that the gelatin solution is in liquid form at room temperature, thereafter treating the liquid layer to stop the effect of such substance whereby the gelatin solution is caused to set in gel form, treating the photographic element carrying such gelatin layer with a bath which has the property of bleaching the silver image and of simultaneously hardening the gelatin over the area of the silver image in proportion to the silver present, and thereafter removing the unhardened gelatin.

8. Process for the production of pigmented gelatin relief images which comprises coating the emulsion surface of a photographic element carrying a silver image, at room temperature, with an aqueous solution of gelatin containing a finely divided pigment in suspension and containing a water-soluble gelatin liquefying substance in such amount that the gelatin solution is in liquid form at room temperature, thereafter treating the liquid layer with an aqueous bath to dissolve out such water-soluble substance whereby the gelatin solution is caused to set in gel form, treating the photographic element carrying such gelatin layer with a bath which has the property of bleaching the silver image and of simultaneously hardening the gelatin over the area of the silver image in proportion to the silver present, and thereafter removing the unhardened gelatin.

9. Process for the production of pigmented gelatin relief images which comprises coating the emulsion surface of a photographic element carrying a silver image, at room temperature, with an aqueous solution of gelatin containing a finely divided pigment in suspension and containing a water-soluble gelatin liquefying substance in such amount that the gelatin solution is in liquid form at room temperature, thereafter treating the liquid layer with a solution of an agent capable of reacting with the said substance and thereby stop its effect on the melting point of the gelatin solution, whereby the gelatin solution is caused to set in gel form, treating the photographic element carrying such gelatin layer with a bath which has the property of bleaching the silver image and of simultaneously hardening the gelatin over the area of the silver image in proportion to the silver present, and thereafter removing the unhardened gelatin.

10. Process for the production of pigmented gelatin relief images which comprises coating the emulsion surface of a photographic element carrying a silver image, at room temperature, with a solution of gelatin containing a finely divided pigment in suspension and containing urea in such amount that the gelatin solution is in liquid form at room temperature, thereafter treating the liquid layer with an aqueous bath to dissolve out the urea, whereby the gelatin solution is caused to set in gel form, treating the photographic element carrying such gelatin layer with a bath which has the property of bleaching the silver image and of simultaneously hardening the gelatin over the area of the silver image in proportion to the silver present and thereafter removing the unhardened gelatin.

OSWALD STEIN.

REFERENCES CITED

The following references are of record in the file of this patent:

UNITED STATES PATENTS

| Number | Name | Date |
| --- | --- | --- |
| 2,158,117 | Grettie | May 16, 1939 |
| 1,755,130 | Pomeroy | Apr. 15, 1930 |
| 1,519,004 | Muller | Dec. 9, 1924 |
| 2,244,905 | Crawford | June 10, 1941 |
| 2,112,023 | Hosking | Mar. 22, 1938 |
| 1,851,166 | Kienninger | Mar. 29, 1932 |